Nov. 2, 1954   T. J. RHODES   2,693,007
MOLDING METHOD
Filed April 18, 1950   5 Sheets-Sheet 1
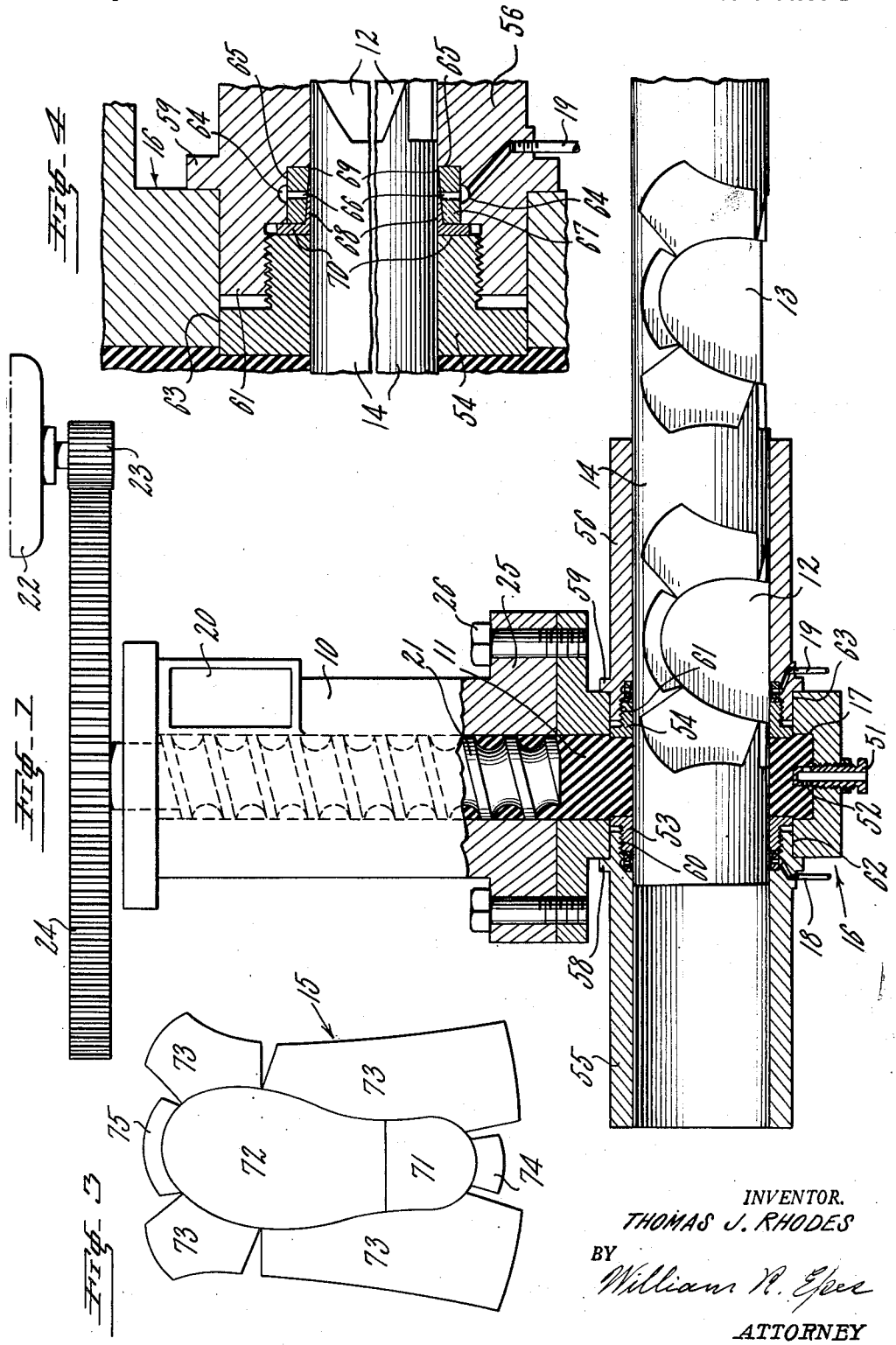
INVENTOR.
THOMAS J. RHODES
BY
William R. Epes
ATTORNEY

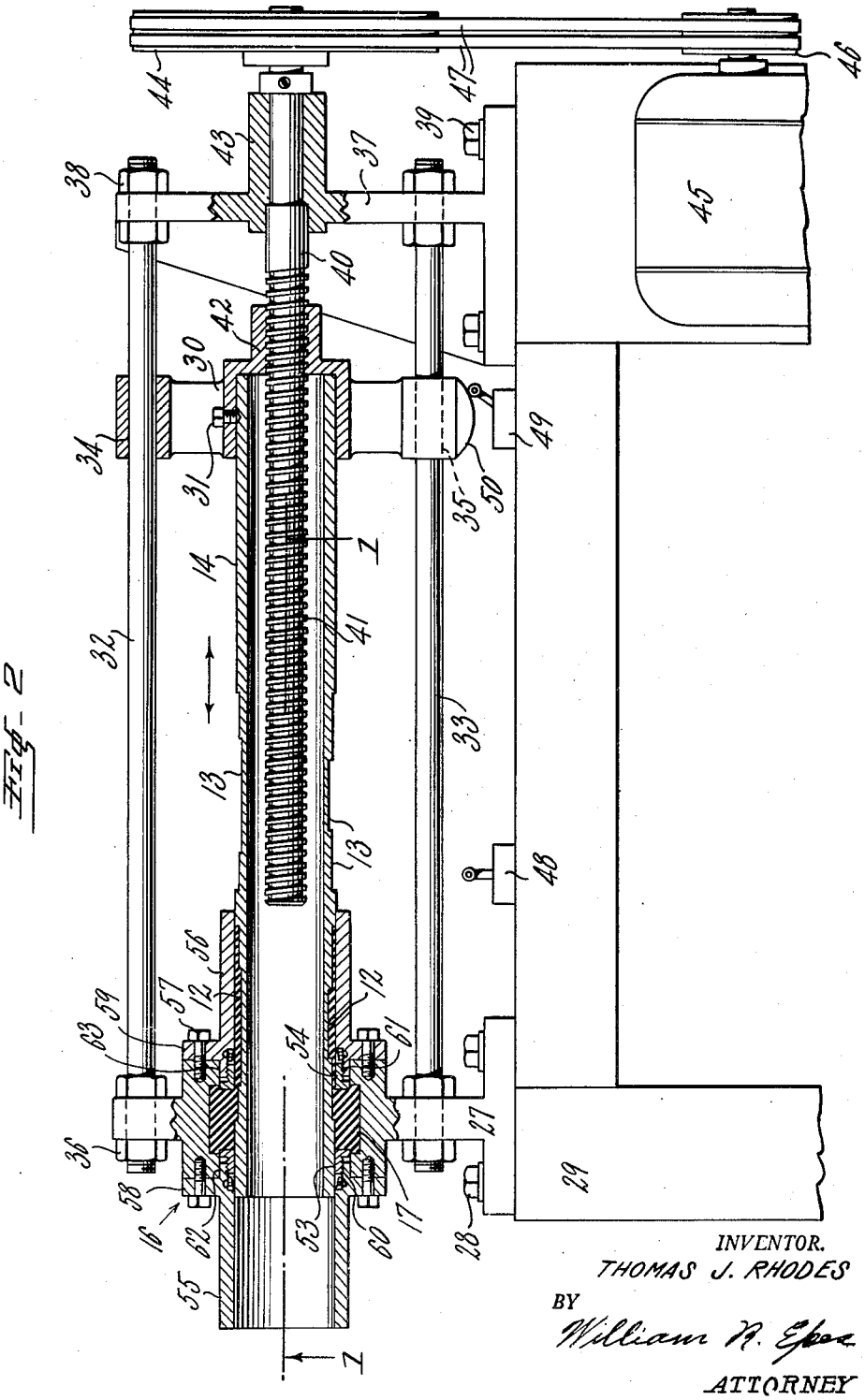

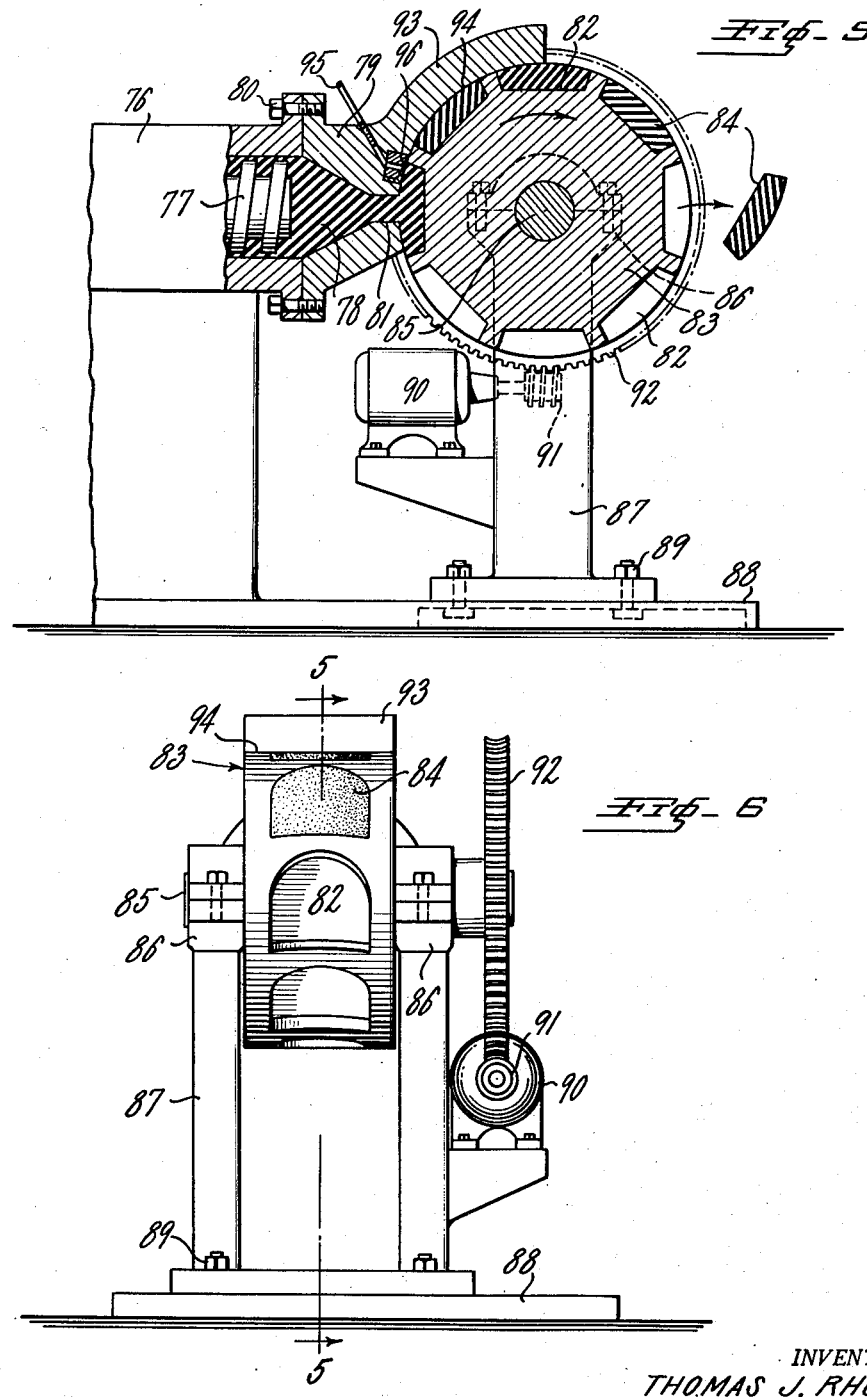

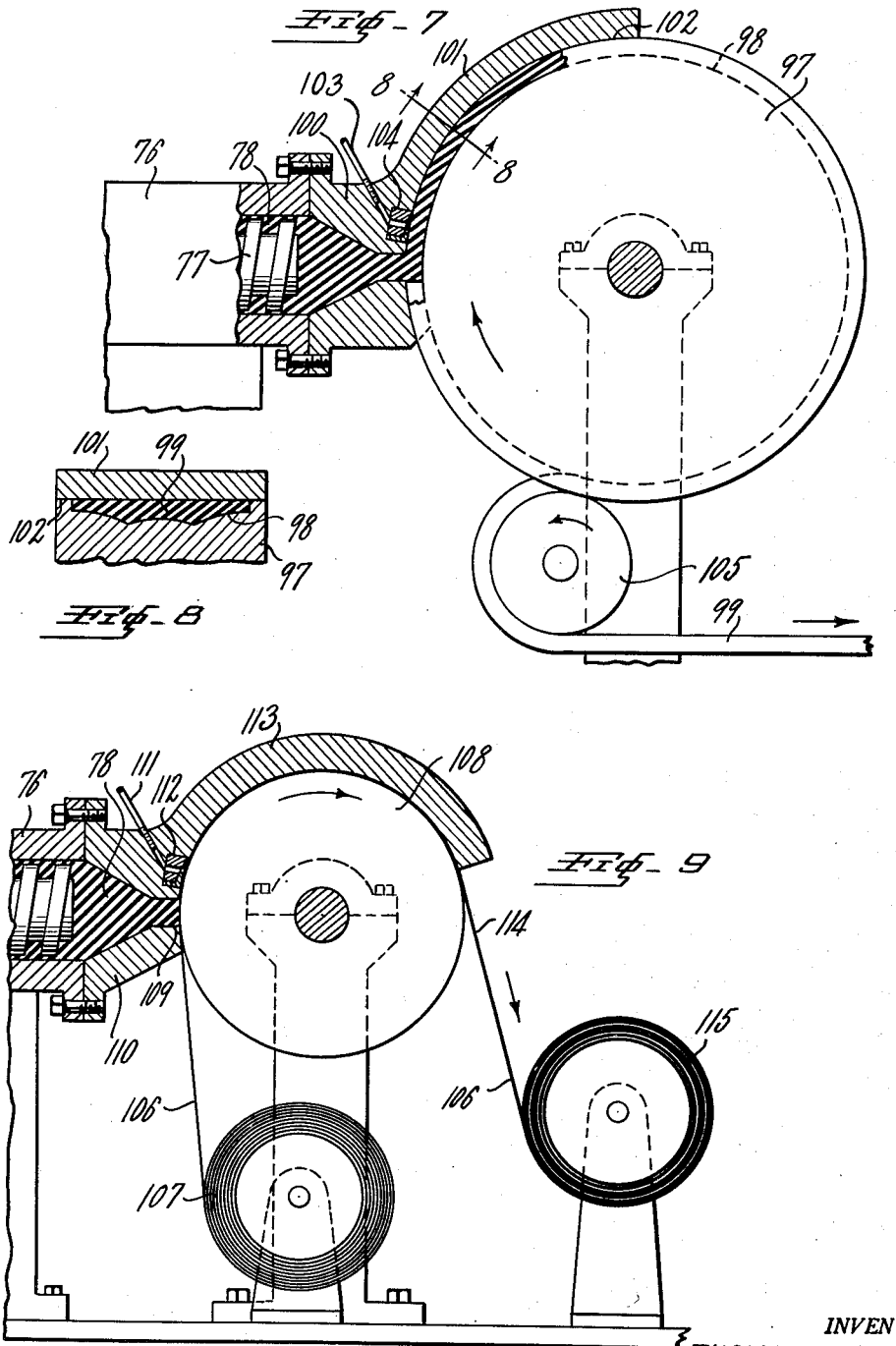

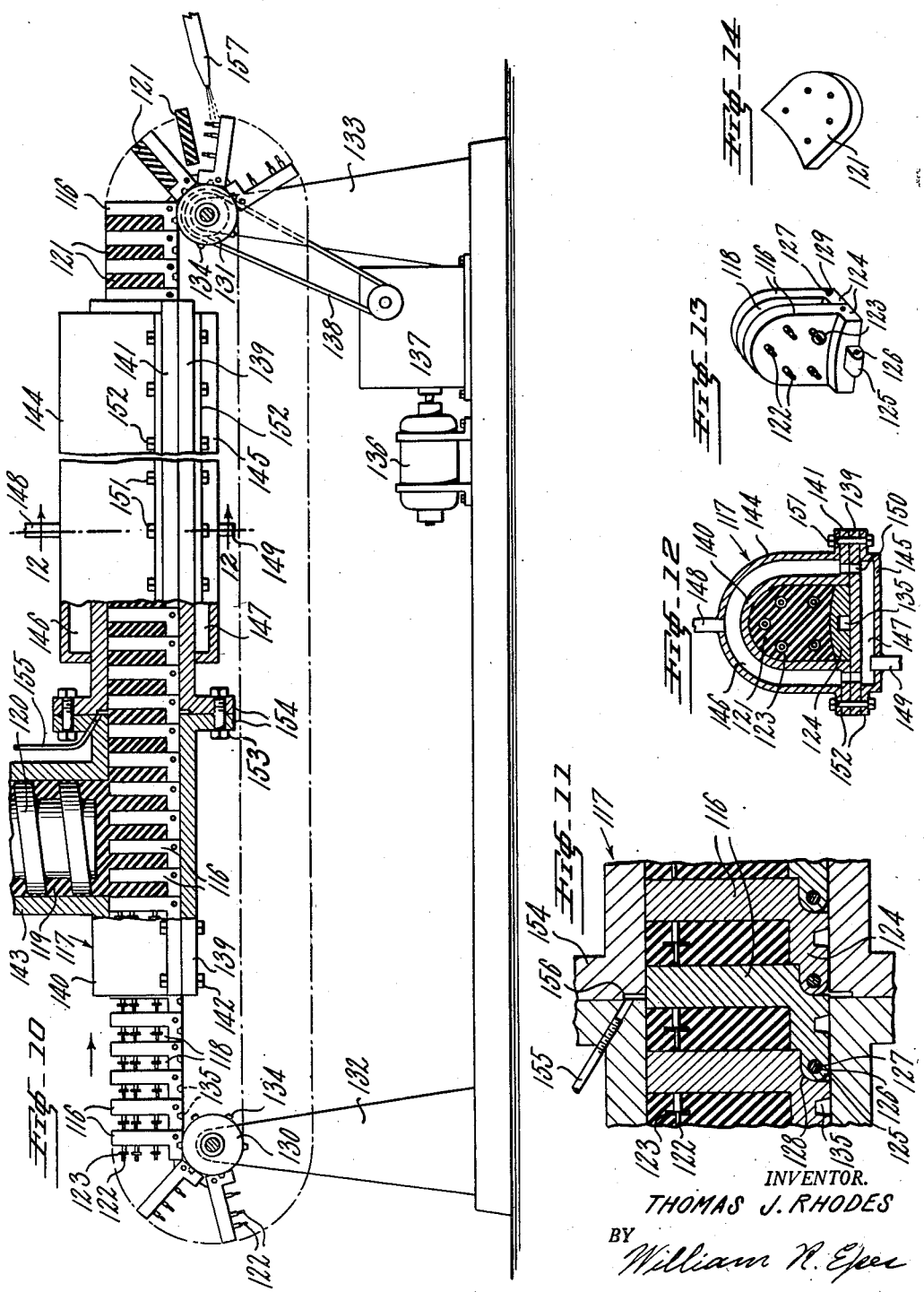

United States Patent Office 2,693,007
Patented Nov. 2, 1954

2,693,007

MOLDING METHOD

Thomas J. Rhodes, Clifton, N. J., assignor to United States Rubber Company, New York, N. Y., a corporation of New Jersey Application April 18, 1950, Serial No. 156,617

2 Claims. (Cl. 18—55)

This invention relates to an improved method for more accurately shaping plastic products having an elastic memory, such as raw rubber compounds, by shaping the plastic under pressure in a cavity formed between a stationary lubricated surface and a movable surface which is adapted to control the rate of movement of the plastic and the time it remains under confinement in the cavity between the stationary and the movable surface.

Heretofore when a raw rubber compound has been shaped by extruding it under pressure through the usual extruder orifice, or into a cavity formed between a stationary and a movable surface and conveyed to a point where it is released from the confining pressure, the raw rubber changes its shape to some extent due to its property known as elastic memory. Furthermore it has been very difficult to control the amount of change of shape which takes place and to obtain an accurately shaped product.

I have found that the uniformity of the dimensions of the shaped product can be controlled to a fine degree by forcing the raw plastic into a cavity formed between a stationary surface which is lubricated and a surface which is moved with the plastic and thereby controls the rate of movement of the plastic to permit it to become stabilized through a loss of its elastic memory. It is believed the loss of the elastic memory of the plastic in the shaping cavity is the result of relieving the plastic from the continued application of the extrusion pressure at the time the shaped plastic is released from the confinement of the shaping cavity and also the result of relieving the plastic from the agitation that may be caused by the friction of the plastic on the stationary wall of the shaping cavity.

There are several embodiments of my invention disclosed herein, one of which comprises a method and apparatus particularly suitable for shaping relatively thin products by extruding the plastic into a distributing chamber which surrounds a reciprocating plunger having one or more molding recesses therein, said recesses being adapted to be filled under pressure in the chamber and reciprocated through a lubricated confining sleeve.

In another embodiment of the invention, my novel process is carried out in an apparatus in which the mold cavities having the shape of the desired product are formed in the surface of a rotating drum which engages the orifice of the extruder. The plastic is extruded into the mold cavities as the drum rotates. A stationary lubricated confining shield in engagement with the surface of the rotating drum serves to maintain the extruded plastic within the mold cavities for a sufficient length of time to become substantially dimensionally stabilized.

Another embodiment of the invention is particularly suitable for shaping continuous lengths or strips of plastic material, such as rubber tire treads. Such apparatus comprises a rotating drum which engages the orifice of the extruder and which has on its face a circumferential cavity cut out in the contour of the desired article. This form of the invention also has a stationary, lubricated confining shield in engagement with the rotating drum. The plastic is extruded in the form of a strip between the stationary lubricated shield and the rotating drum, and the forward movement of the strip along the lubricated stationary shield is controlled by the speed of the rotating drum. In this way the extruded strip is confined in the desired shape between the lubricated surface of the stationary shield and the moving surface of the drum until the plastic has substantially lost its tendency to recover elastically.

In still another embodiment of the invention I provide apparatus for applying a relatively thin layer of plastic of accurately controlled thickness to a continuous strip of flexible base material, usually a textile fabric base. In this form of the invention a strip of textile fabric or other base is passed over a rotating drum in engagement with the extrusion orifice. A thin coating of plastic is extruded onto the surface of the base as it is moved across the extrusion orifice. The plastic and base thus form a laminate which is carried around on the surface of the rotating drum. A lubricated, stationary confining shield contacts the surface of the moving plastic coating and maintains the plastic at the desired thickness until it has substantially lost its tendency to recover elastically.

In a further embodiment of the invention, I provide apparatus which is particularly suitable for shaping and vulcanizing products in a continuous operation. This form of the invention comprises an elongated stationary confining and curing tube, through which a series of spaced mold members are continuously passed, the mold members being so disposed and shaped as to define, together with the walls of the stationary confining and curing tube, mold cavities having the shape of the desired product. The plastic material, for example, vulcanizable rubber stock, is extruded continuously into the thus-formed mold cavities as they pass through the confining tube. A thin film of lubricant is introduced continuously between the walls of the stationary confining tube and the moving mold members containing the plastic stock.

The foregoing embodiments of this invention are disclosed in the accompanying drawings, in which:

Fig. 1 is a plan view, partly in section on line 1—1 of Fig. 2, of a portion of a molding apparatus for molding rubber shoe or clog preforms, constructed in accordance with the present invention;

Fig. 2 is a side elevation of the same apparatus on a smaller scale, shown partly in section;

Fig. 3 is a plan view of a rubber clog preform, as molded by the apparatus;

Fig. 4 is an enlarged view of a portion of Fig. 1, showing the lubricant applying means in more detail;

Fig. 5 is a side elevational view, partly in section on line 5—5 of Fig. 6, of a modification of the invention adapted to the molding of preforms for rubber heels and the like;

Fig. 6 is a front elevational view of the apparatus of Fig. 5;

Fig. 7 is a side elevation view partly in section, of an additional modification of the invention for the extrusion of tire treads and the like;

Fig. 8 is a sectional view of part of the apparatus taken along the line 8—8 of Fig. 7;

Fig. 9 is a side elevation, partly in section, of a further modification of the invention adapted to application of a thin uniform coating of plastic onto a flexible base material;

Fig. 10 is a side elevation, partly in section, of a modification of the invention for continuous molding and vulcanizing of heels for footwear;

Fig. 11 is an enlarged view of part of the apparatus of Fig. 10, showing details of the lubricant applying means;

Fig. 12 is a cross-sectional view of the apparatus taken along the line 12—12 of Fig. 10;

Fig. 13 is a perspective view showing mold link members removed from the apparatus of Fig. 10; and Fig. 14 is a perspective view of a rubber heel, as molded in the apparatus shown in Fig. 10.

Referring to Fig. 1, the embodiment of the invention shown in the drawings comprises a stuffer or extruder 10 for delivering rubber or other moldable plastic material 11 under pressure to mold cavities 12 and 13 formed in the surface of a cylindrical plunger 14. The mold cavities 12 and 13 are open-faced and are of relatively large area as compared to depth and have a shape adapted to produce the flat preforms 15, shown in Fig. 3, for the manufacture of rubber footwear or clogs. The plunger 14 is reciprocated axially in a horizontal cross-head sleeve assembly 16 attached to the extruder 10 and having an annular distributing chamber 17 for receiving the plastic 11 from the extruder. The cross-head assembly 16 is adapted to distribute the plastic all around the plunger 14, and the mold cavities 12 and 13 become completely and uniformly filled with plastic as the plunger 14 passes through the cross-head 16. The cross-head sleeve assembly 16 tightly closes the otherwise open-faced mold cavities 12 and 13 in which the plastic stock 11 is sheared off at exactly the desired thickness and is held under pressure while the plunger 14 is sliding through the cross-head 16. Movement of the plunger 14 and plastic preform in the cross-head sleeve assembly 16 is made possible without encountering prohibitively high resistance, by lubrication of the plastic 11 and the plunger bearing surface in the sleeve assembly 16. The lubricant is pumped through lubricating ducts 18 and 19 leading into the cross-head 16. The plunger 14 is automatically reversed at each end of its stroke and its speed is regulated so that the preforms 15 may be removed from the cavities 12 and 13 while they are outside of the sleeve assembly 16.

Considering the molding apparatus in more detail, the extruder 10 may be of conventional design and has a hopper 20 into which plastic stock 11, for example, vulcanizable rubber stock, is fed. A feeding screw 21 within the extruder 10 advances the rubber stock 11 under pressure. It is understood that the feeding screw 21 may be driven by conventional means, such as a motor 22 which drives the screw 21 through a gear 23 on the shaft of the motor 22 and a gear 24 on the end of the screw 21.

The cross-head assembly 16 is securely attached to the outlet end, or head 25, of the extruder 10 by means of bolts 26, and is adapted to receive the horizontally sliding reciprocating cylindrical plunger 14 in which the mold cavities 12 and 13 are engraved. The cross-head 16 is adapted to distribute the rubber stock 11 around the said plunger to all parts of the mold cavities so that the radial pressures exerted on the plunger 14 by the stock 11 are substantially equalized.

For the purpose of supporting the cross-head 16 and the plunger 14, the bottom of the cross-head member 16 is provided with a vertical supporting standard 27 (Fig. 2), secured by bolts 28 to a frame work 29, which is conveniently mounted on wheels (not shown), so that the entire cross-head assembly 16 and associated parts may be easily moved away from the extruder 10, after disengagement of the head bolts 26, for such purposes as cleaning the machine, etc.

The frame work 29 also supports means for horizontally reciprocating the cylindrical plunger 14, so that the mold cavities 12 and 13 may be charged with rubber stock by moving the plunger 14 axially in either direction in the cross-head assembly 16. For this purpose, one end of the plunger 14 is provided with a yoke 30 secured thereto by a set screw 31. The yoke 30 slidably engages an upper horizontal guide rail 32 and a lower horizontal guide rail 33 which pass through holes 34 and 35 provided for this purpose on the upper and lower arms of the yoke 30. These guide rails are secured at one end to the cross-head assembly 16 by means of nuts 36 on the threaded ends of the rails, and at the other ends the rails are similarly secured to an upright supporting standard 37 by nuts 38. The standard 37 is in turn attached to the supporting frame 29 by bolts 39.

The desired horizontal reciprocating motion is imparted to the plunger 14 through a horizontal rotatable driving shaft 40 having a threaded section 41 engaging a correspondingly threaded extension 42 on the center of the sliding yoke 30, and passing therethrough into the interior of the plunger 14, which is hollow. The driving shaft 40 is rotatably supported by a suitable bearing assembly 43 on the vertical standard 37, and carries on its end a driving wheel 44 which is driven by a reversible motor 45 through a pulley 46 and driving belts 47.

It will be evident that as the driving shaft 40 is rotated by the motor 45, the threaded section 41 of the shaft 40 will cause the sliding yoke 30 to move horizontally along the guide rails 32 and 33, thereby moving the plunger 14 through the cross-head assembly 16. The travel of the plunger 14 is automatically controlled by two travel limit switches 48 and 49 mounted on the frame work 29 below the lower guide rail 33. These travel limit switches 48 and 49 are devices of known construction, and they are electrically connected to the reversible plunger-driving motor 45 by conventional means (not shown) to control the direction of rotation of the motor 45, and thereby control the direction and extent of travel by the reciprocating plunger 14. The travel limit switches 48 and 49 are actuated by contact with a curved extension 50 on the bottom of the sliding yoke 30. Thus, for example, when the plunger 14 and attached yoke 30 are travelling horizontally from right to left in the drawing, and the yoke 30 approaches the cross-head assembly 16, the travel limit switch 48 is tilted by the extension 50 on the yoke 30 at proper instant, reversing the motor 45 and causing the plunger 14 to travel in the opposite direction until the opposite travel limit switch 49 is tilted by the extension 50 as shown in Fig. 2, whereupon the direction of travel is again automatically reversed.

Turning now to the structural details of the means associated with the cross-head assembly 16 for distributing the rubber stock 11, there is provided within the cross-head 16 an annular distributing passageway 17, for the rubber stock 11, which is in communication with the extruder 10, and which surrounds the plunger 14 so that the extruded stock 11 exerts equal radial pressures on the plunger 14 and has ready access to all parts of the mold cavities 12 and 13 as they are passed axially through the cross-head 16. Leading from the distributing passageway 17, on the opposite side of the plunger 14 from the extruder 10, there is provided an adjustable bleed outlet comprising a tube 51 (Fig. 1) threaded through the wall of the cross-head 16 and having openings 52 which permit escape of air from the rubber stock 11. The bleed opening is adjusted as the tube 51 is advanced into or withdrawn from the distributing passageway 17, by turning the tube 51.

Disposed on either side of the annular distributing passageway 17 are two annular shearing rings 53 and 54 that fit around the cylindrical plunger 14 and that have an internal diameter only sufficiently larger than the plunger 14 so that the plunger is enabled to slide axially therethrough in closely fitting engagement therewith. These rings 53 and 54 serve to shear off the rubber stock 11 which has been forced into the mold cavities 12 and 13 under pressure, smoothly and evenly level with the surface of the reciprocating plunger 14.

In order to define a tightly closed mold cavity with the reciprocating plunger 14, there are provided two cylindrical confining sleeves 55 and 56 closely fitted around the plunger 14. These sleeves 55 and 56 are attached on either side of the cross-head 16, and are secured thereto by bolts 57 (Fig. 2) extending through flanges 58 and 59 on the sleeves 55 and 56. The sleeves 55 and 56 are provided with threaded extensions 60 and 61 which fit into openings 62 and 63 on either side of the cross-head 16. The threaded extensions 60 and 61 serve to support the aforementioned shearing rings 53 and 54, which are correspondingly recessed and threaded thereto, so as to fit snugly in the recesses 62 and 63 and to form, together with the sleeves 55 and 56, a smooth, continuous, closely fitting cylindrical passageway for the reciprocating plunger 14.

In order to make it possible to reciprocate the plunger 14 without necessity of exerting tremendous forces thereon, there is provided means for continuously supplying and maintaining a constant uniform liquid lubricating film between the outer surfaces of the plunger 14 and the rubber stock 11 in the mold cavities 12 and 13, and the inner surfaces of the sleeves 55 and 56 and shearing rings 53 and 54. Suitable lubricants include any liquids which are not deleterious to the rubber and which have anti-sticking properties, e. g., a 4 to 6% by weight solution of hide glue in water, a 20% aqueous solution of the sodium sulfonate of oleyl methyl lauride, paraffin oil, etc. I may also employ other lubricants, such as silicone mold release fluid, glycerine, soap solutions, etc. Generally, I prefer to employ a lubricant which is immiscible or incompatible with the plastic material being shaped. Such lubricants may be introduced from a conventional pumping system (not shown) capable of delivering relatively small volumes of lquid at moderately high positive pressures (e. g., 1500–2000 p. s. i.).

The lubricant is passed through inlet tubes 18 and 19 passing through the walls of the sleeves 55 and 56 near the cross-head 16 (Fig. 1). Each inlet tube leads into an internal annular distributing passageway 64 (Fig. 4), one of such passageways being provided in each of the sleeves 55 and 56. Referring to Fig. 4, the annular distributing passageway 64 passes circumferentially around a recessed portion 65 provided in the inside wall of the sleeve 56. The lubricant passes from inlet tube 19 into the annular passage 64 and into a plurality of radial delivery holes 66 drilled through a spacer ring 67 located in the recess 65. The holes 66 supply the lubricant to an annular tapered lubricant applicator sleeve 68 which is disposed over the face of the spacer ring 67 and covers the holes 66. A small clearance between the face of the spacer ring 67 and the sleeve 68 permits a thin film of lubricant to pass out at the tip 69 of the sleeve. The sleeve 68 prevents the rubber stock 11 from entering into the lubricant delivery holes 66 and also aids in distributing the lubricant evenly. The sleeve 68 is provided with a retaining flange 70 which is assembled in place by screwing the shearing ring 54 into the threaded confining sleeve extension 61. An identical lubricant distributing arrangement is provided in association with confining sleeve 55 and shearing ring 53 at the other side of the cross-head assembly 16.

The manner of operation of the molding apparatus will be described with reference to the production of rubber preforms 15 to be fastened into rubber clogs. These preforms, as shown in Fig. 3, are of considerably larger area than it has heretofore been considered practical to fabricate by injection molding of rubber, since it would ordinarily require tremendous extrusion pressure to cause rubber to flow evenly and compactly into a thin, shallow mold cavity of such large area. The preform is constituted of a relatively thick heel portion 71, a thinner sole portion 72, thinner side members 73, and a thin heel tab 74 and toe tab 75. This relatively flat pattern is reproduced on the surface of the reciprocing cylindrical plunger 14 in the form of engraved cavities 12 and 13, the various parts of which are engraved to various depths, corresponding to the desired thickness of the various sections of the preforms.

The rubber stock 11 from which it is desired to make the preform is fed to the hopper 20 of the extruder 10, and is forced under pressure by the feeding screw 21 into the annular distributing passageway 17 in the cross-head 16. It will be understood that the extruder 10 and the cross-head 16 may be heated by any conventional means (not shown) to render the rubber stock 11 more plastic.

A suitable liquid lubricant is fed under positive pressure through the inlet tubes 18 and 19 into internal annular distributing passageways, such as passageway 64 (Fig. 4), whence it has access to the surfaces of the plunger 14 by passing through the radial delivery holes 66 and out under the tip 69 of the tapered applicator sleeve 68. The excess of lubricant flows out of the open ends of the confining sleeves 57 and 58 as well as out of the bleed tube 52.

The plunger 14 is caused to reciprocate in the distributing passageway 17 in the cross-head 16 by revolution of the threaded driving shaft 40 by the motor 45, as noted previously. As the cavity 12 of the plunger passes from right to left through the mass of rubber stock 11 in the passageway 17, the cavity 12 becomes completely and compactly filled with rubber stock 11. It is observed that the combination of the annular distributing passageway 17 with a properly adjusted bleed outlet 52 on the far side thereof makes it possible to fill the large mold cavity 12 by exerting only moderate and ordinary extrusion pressures on the rubber stock.

Continued travel of the lubricated plunger 14 and the cavity 12 causes the stock 11 in the cavity to be sheared off against the lubricated edge of the shearing ring 53 as the cavity 12 proceeds into the lubricated confining sleeve 55. It should be noted that the confining sleeve is of such length that the minimum axial distance from the edge of the distributing passageway 17 to the open end of the sleeve is greater than the greatest axial dimension of the cavity 12. In this way the rubber stock 11 in the cavity 12 is completely confined by the walls of the cavity 12 and the inner wall of the sleeve 55 when the cavity 12 has moved into the sleeve 55. This construction makes it possible to fill the cavity 12 under considerable extrusion pressure. Confining the rubber under pressure between the stationary lubricated sleeves and the moving plunger in this manner in exactly the desired dimensions result in a substantial stabilization of the dimensions of the preforms 15; that is, the tendency of the preforms to "recover" or change in size upon subsequent removal from the cavities is greatly reduced, with the result that waste of material from defective articles due to inaccurately sized preforms is largely eliminated. The production of accurately sized preforms in this manner would be impossible, because the enormous friction between the surface of the rubber preform 15 and the surfaces of the shearing rings 53 and 54 and the confining sleeves 55 and 56 would disrupt the rubber and prevent stabilization, if it were not for the fact that a continuous film of lubricant is maintained therebetween.

As the plunger 14 continues its movement from right to left, the cavity 12 emerges from the confining sleeve 55, and the preform 15 is readily moved therefrom, having no tendency to stick to the walls of the cavity, because of the lubricating film on the walls thereof. The motion of the plunger 14 is thereupon automatically reversed by contact of the curved extension 50 on the yoke 30 with the travel limit switch 48 as noted previously. The cavity 13 is filled with rubber in the same manner as cavity 12, and upon emergence of the cavity 13 from the sleeve 56, the preform 15 is removed therefrom as before, and the direction of travel of the plunger 14 is again reversed.

From the foregoing it is seen that this form of the invention provides an apparatus for rapid and convenient production of compactly molded, accurately dimensioned preforms or the like, free from flash or molding defects.

Because the mold cavities 12 and 13 are engraved on the surface of a plunger 14 that is readily removable from the apparatus by disengaging the set screw 31, a variety of different sizes and shapes of articles can be produced conveniently by changing plungers. Since the plunger 14 is of relatively light and simple construction sets of cavities of various sizes and shapes can be made economically and made available for replacement.

This form of the invention is particularly well adapted to fabricating very thin articles of relatively large area. This is accomplished with very little force compared to the forces required for conventional injection molding or calendering of similarly shaped articles, because of the principle of lubrication as well as the principle of distributing the plastic stock, such as through the annular distributing passageway 17, around the plunger 14, so that the radial pressures exerted on the plunger by the stock are substantially balanced. The whole operation and structure of the machine are simplified because the desired mold design is laid out on a curved surface, such as the surface of the cylindrical plunger 14.

If desired, the sleeves 55 and 56 may be equipped with any conventional heating means for heating to vulcanizing temperatures, and may be made of such length that the shaped rubber article is confined therein for a time sufficient for it to become partially or completely vulcanized. In this way the machine can be readily adapted to the production of partially vulcanized articles or of completely vulcanized articles.

Referring to Figs. 5 and 6, the modification of my invention shown therein comprises a conventional extruder 76 having a rotating feeding screw 77 for advancing plastic stock 78 under pressure. An interchangeable extrusion head 79 is secured to the delivery end of the extruder 76 by means of bolts 80. The head 79 has an extrusion outlet or die passage 81 for delivering the plastic 78 to a series of mold cavities 82 formed around the periphery of an interchangeable rotary drum 83, which is in close engagement with the extrusion head 79. The cavities 82 have the shape of preforms 84, which are to be reformed into shoe heels by any suitable known method.

The drum 83 is mounted for rotation on a horizontal shaft 85, which rotates in bearing assemblies 86 supported on vertical standards 87. In order that drums of various sizes may be substituted readily for the drum 83, the vertical standards 87 are preferably adjustably secured to the base 88 of the machine by means of bolts 89, the position of which may be changed to accommodate drums of different diameters.

The drum 83 may be rotated by any suitable means, such as by means of a motor 90. The motor has a worm gear 91 on its shaft in engagement with a driving gear 92 on the end of the shaft 85 of the drum 83.

In order to confine the plastic material 78 in the mold cavities 82 for a sufficient length of time for the plastic preforms 84 to become dimensionally stabilized, there is provided a stationary confining shield 93 which extends upwardly from the extruder head 79 and closely engages the outer surface 94 of the drum 83 over a portion of its circumference. The relationship between the rate of rotation of the drum 83 and the length of the shield 93 is such that the plastic is confined in the cavities 82 for a time sufficient for the plastic to substantially lose its tendency to change size upon subsequent release of the confining pressure to which the advancing plastic preforms 84 are subjected within the cavities 82.

In order that the preforms 84 may become substantially dimensionally stable in the desired manner, it has been found necessary, as indicated previously, to provide lubrication of the surface of the plastic forms 84 as they pass along the inner surface of the confining shield 93. For this purpose, a lubricant inlet 95 is provided in the extruder head 79 through which a suitable liquid lubricant is pumped under positive pressure by conventional means (not shown). A thin film of the liquid lubricant is distributed evenly over the surface of the advancing plastic by means of a lubricant applicator assembly 96, in the same manner as described previously in connection with Fig. 4. In this way a continuous thin film of lubricant is maintained between the surface of the advancing plastic form 84 and the surface of the confining shield 93.

The method of operation of this form of the invention is such that as the drum 83 is rotated in a clockwise direction as viewed in Fig. 5, the cavities 82 on the face thereof are brought into engagement with the orifice 81 in the extruder head 79, and the cavities are thereby charged with plastic stock 78 under pressure by the action of the delivery screw 77 of the extruder 76. Immediately after passing before the charging orifice 81, the plastic-filled cavities pass before the lubricant applicator assembly 96 and the surface of the preform 84 is covered with a thin uniform film of liquid lubricant. Continued rotation of the drum 83 causes the preforms 84 confined in the cavities 82 to be advanced at a controlled rate, while being confined under pressure in the desired shape by the stationary lubricated shield 93. When the stock 78 being extruded is vulcanizable rubber stock of the kind from which rubber heels are ordinarily made, it is found that the preferred relation between the length of the confining shield 93 and the rate of rotation of the drum 83 is such that the forms 84 are confined within the cavities 82 under the shield 93 for at least two seconds, and preferably for four to ten seconds, five seconds being about optimum, for satisfactory stabilization of the dimensions thereof.

The modification of the invention shown in Figs. 7 and 8 for shaping of continuous lengths of plastic stock, such as rubber tire treads, comprises a conventional extruder 76 having a rotating feed screw 77 for delivering plastic stock 78 under pressure, as described previously in connection with Fig. 5. In this form of the invention a rotating drum 97 has a continuous circumferential cavity 98 cut out of its cylindrical face in the profile of a tire tread preform 99 as indicated in Fig. 8. The extruder head 100 has extending upwardly therefrom a stationary confining shield 101 which engages the flat edges 102 of the face of the drum 97, and serves to confine the extruded tire tread section 99 in the desired shape until it is largely dimensionally stabilized.

The friction between the extruding rubber stock 78 and the bottom surface of the cavity 98 of the drum 97 is so high that the stock would not be extruded if it were not for the fact that the clockwise rotation of the drum 97 assists and controls the advancement of the stock. The surface of the advancing rubber tread 99 in contact with the under side of the stationary confining shield 101 is lubricated by means of a lubricant inlet 103 and lubricant applicator assembly 104 of the character previously described.

A take-off pinch roll 105 serves to keep the advancing rubber tread 99 firmly against the rotating drum, thereby restraining the tread from shrinking. The tread may be cut into suitable lengths and carried away from the machine by conventional means (not shown). The cutting operation is preferably carried out while the tread is held against shrinkage on the surface of the drum. In this way a rubber tire tread preform is obtained having a more exactly controlled size and volume than has heretofore been obtainable by conventional extrusion methods. The combination of the rotary drum 97 and lubricated stationary confining shield 101 insures formation of a tire tread of correct profile. Cutting the tread into the desired length while it is still adhering to the surface of the rotating drum, and is therefore held against shrinkage insures accurate length of tread when the cutting operation is so timed that the extent of rotation of the drum after each cut is such that the periphery of the drum travels a distance corresponding to the desired length of the tread.

Therefore, this apparatus reduces the wastage of rubber inherent in conventional methods of preforming tire treads by extrusion wherein it is extremely difficult to prevent the extruded tread from occasionally running oversize or undersize due to time-to-time changes in the amount of elastic recovery of the stock as it emerges from the conventional extruder die. Such variations are caused by unavoidable changes in the viscosity of the stock being extruded, changes in the temperature of the extruder, etc. Similarly the length of the tread usually cannot be accurately controlled in the conventional extrusion method, because shrinkage of the tread tends to be variable and unpredictable. Such deviations of the tread preform from the desired profile and length result in poorly formed tires and excessive rejects and scrap.

Because the plastic stock 78 is carried into the shaping cavity 98 by rotation of the drum, various profiles are obtainable without experiencing difficulty from uneven rates of flow of plastic at various points across the width of the product, as is the case when irregular profiles are extruded from conventional dies.

Since the flow of the plastic through the shaping passage is controlled by the rotation of the drum, extremely thin cross-sections can be shaped by this method. This fact is taken advantage of in the embodiment of the invention shown in Fig. 9 for applying a thin coating of plastic, such as a skim coating of rubber, onto a flexible base, such as a continuous length of textile fabric. Referring to Fig. 9, a textile fabric 106 is passed from a supply roll 107 over the surface of a rotating drum 108. The extruder 76 delivers plastic stock 78 to the surface of the fabric as it passes on the surface of the drum 108 before the extrusion orifice 109 in the extruder head 110. The extruder head 110 is also provided with a lubricant inlet 111 and lubricant applicator means 112 as previously described. A stationary confining shield 113 extends from the extruder head 110 around a portion of the drum 108.

As the fabric passes before the orifice 109, it becomes covered with a thin coating 114 of plastic, the thickness of which is determined by the clearance between the rotary drum 108 and the confining shield 113. The surface of the plastic coating 114 is lubricated as it passes by the applicator 112, and the gage of the plastic is largely stabilized as it passes around with the drum 108 in confining relation with the shield 113. The resulting smooth, uniform, plastic coated fabric may be wound up in a package 115 by any suitable conventional wind-up means.

The foregoing embodiment of the invention is capable of coating fabric or other flexible bases with thin layers of rubber or plastic material with greater dimensional accuracy than is obtainable with the calendering machines conventionally used for this purpose. Also, the machine may be much lighter in construction and requires less power than conventional calenders, because the tremendous wedging forces encountered in the "bite" between conventional calender rolls are not present. Instead, the movement of the plastic stock along the lubricated surface of the confining shield 113 is accomplished with ordinary moderate extrusion pressure. This is possible because of the combination of the lubrication feature with the fact that movement of the plastic is assisted and controlled by rotation of the drum and fabric.

The modification of the invention shown in Figs. 10 to 14 comprises a continuous series of upright spaced mold members 116 which are linked together and are passed horizontally through an elongated closely-fitting stationary confining chamber 117. The spaces 118 between the upright mold members 116 are charged with plastic stock 119 after passing into the confining chamber 117 by means of a suitable stuffer such as a conventional extruder having a rotating feeding screw 120 for advancing the plastic 119 under pressure.

As illustrated, the mold links 116 are designed for shaping rubber heels 121 (Fig. 14). As shown in the perspective view, Fig. 13, the mold links 116 are provided with a plurality of projecting pins 122 adapted to hold heel washers 123 in place during the molding operation, as is conventional practice. It will be understood that the washers 123 are placed on the pins 122 by hand or otherwise before the links 116 pass into the chamber 117. The upright mold links 116 are spaced apart a distance equal to the desired thickness of the finished heel 121 by means of horizontally projecting base members 124.

In order to link or hinge the mold members 116 together so as to form a continuous chain-like linkage which can be passed through the charging and confining chamber 117 continuously, the base of each mold link is provided with a central rounded connecting projection 125 having a hole 126 therethrough for receiving a retaining pin 127 (Fig. 11). Each connecting projection 125 fits into a corresponding recess 128 (Fig. 11) in the opposite side of the adjacent mold member. The retaining pin 127 passes through a hole 129 (Fig. 13) in the base of the mold link 116, which mates with the hole 126 in the projection 125, and the links 116 are thereby pivotally joined to each other to form a flexible endless chain.

The endless chain of mold links 116 is moved through the confining chamber 117 on rotatable idler cog wheel 130 (Fig. 10) and a driving cog wheel 131 suitably supported at the entrance and exit ends of the chamber 117 on upright standards 132 and 133, respectively. Suitably spaced radial cogs 134 on the wheels 130 and 131 engage correspondingly spaced recesses 135 in the base of each mold link 116 to control the motion of the molds. The driving cog wheel 131 is powered by a motor 136 through a suitably connected transmission 137 and driving belt 138.

The confining chamber 117 comprises a flat bottom plate 139 over which the bottoms of the mold members 116 slide, and an inverted U-shaped upper piece 140 corresponding to the upper contour of the mold members, which are made with just sufficient clearance to slide snugly therethrough. The bottom ends of the inverted U-shaped member 140 are provided with flanges 141 which are secured to the base plate 139 by means of bolts 142.

As shown, the entrance portion of the confining chamber 117 is made integral with an extruder barrel body 143 containing the feeding screw 120, but it will be understood that the chamber 117 may be constructed independently of and be removably attached to the extruder 143. It will also be understood that the chamber 117 and the extruder 143 are rigidly supported by a suitable framework (not shown).

For the purpose of heating the molded heels to vulcanizing temperatures a part of the chamber 117 is provided with an upper jacket 144 and a lower jacket 145 to form an upper heating chamber 146 and a lower heating chamber 147. An inlet pipe 148 and an outlet pipe 149 are provided for circulation of steam or other heating medium through the heating chambers 146 and 147, which are in communication through holes 150 (Fig. 12) through the flanges 141 and the base plate 139. The chamber jackets 144 and 145 are secured to the confining chamber 117 by bolts 151 passing through suitable flanges 152 on the jackets.

The charging portion and heating portion of the confining chamber 117 are preferably constructed separately and detachably secured together, as by bolts 153 passing through suitable flanges 154 (Fig. 10). This flanged joint, located near the stuffer 143, affords a convenient place for introducing lubricant to the surface of the passing molded heels 121 contained between the mold links 116. For this purpose there is provided a lubricant inlet line 155 through which a liquid lubricant is pumped under positive pressure by a suitable pump (not shown) into a distributing recess 156 (Fig. 11) in the face of the flange 154, whereby the lubricant is distributed entirely around the circumference of the inner wall of the confining chamber 117, and is applied evenly to the surface of the passing mold links and plastic material. Without such a lubricating feature the shearing forces which would have to be overcome to move the plastic-charged molds through the confining chamber would be prohibitively high.

The chain of mold links 116 is passed through the confining chamber 117 either continuously or intermittently at such a speed that the molded heels 121 are retained within the heated portion of the chamber long enough to become vulcanized. As the links 116 emerge from the exit end of the chamber and pass around the driving cog wheel 131 (Fig. 10), the links pivot about the connecting pins 127, thereby separating from each other so that the vulcanized heels 121 can be removed by conventional means, as by an air blast from a suitably located nozzle 157.

This embodiment of the invention affords a convenient and economical means of producing vulcanized rubber heels and the like since no heavy and expensive mold presses are required. The entire process can be carried out largely automatically. There is practically no cured scrap produced, in contrast to conventional molding operations wherein the cured flash must be trimmed off the heels and discarded.

Heels and the like having different brand names embossed thereon or having different thickness can be produced on the one machine, simply by substituting appropriate mold links.

By the foregoing I have illustrated in detail several forms of apparatus for carrying out my novel method of shaping plastic products. In all cases, it is noted that I have achieved close dimensional control of a shaped plastic product by confining the product in the desired shape between a moving member and a lubricated stationary member, the rate of advancement of the shaped product being controlled by the movement of the moving member, so that the product is confined in the desired shape for a time sufficiently long to substantially reduce its tendency to change size after being released from confinement, such time of confinement usually being at least 2 seconds, and preferably 4 to 10 seconds. This is contrasted to conventional extrusion operations, wherein the shaped product is advanced under the influence of the extruding pressure (resulting in considerable change in shape when the extrusion pressure is subsequently relieved) rather than under the influence of a moving shaping member. As the shaped plastic product is being advanced by the moving shaping member it is removed from the influence of the initial extrusion or charging pressure, and when the product is subsequently released from confinement, little change in shape takes place. This feature, in combination with the lubricating feature which prevents disruption, tearing, etc., of the plastic shape against the stationary confining surface results in greater dimensional accuracy than has heretofore been possible, with consequent reduction in production of defective products.

Having thus described my invention, what I claim and desire to protect by Letters Patent is:

1. The method of shaping unvulcanized rubber having an elastic memory that normally causes said rubber to shrink and swell and change its dimensions in a variable manner after extrusion from a die orifice having a definite desired shape, comprising the steps of extruding the said unvulcanized rubber into a confining cavity having the dimensions and shape of the desired article, said cavity being defined between a stationary confining surface and a movable confining surface, moving said plastic in said cavity along with said moving surface at a rate controlled by the movement of said moving surface while the rubber is confined in the desired dimensions and shape, applying lubricant between the surface of the rubber and said stationary confining surface to prevent said movement of the rubber from introducing disrupting strains into the rubber by reason of engagement of the moving rubber with the stationary confining surface, continuing said movement of the lubricated rubber in confinement between said stationary surface and said moving surface for a period of at least two seconds, and thereafter releasing the rubber from confinement, whereby the rubber thereafter substantially retains the dimensions and shape imparted during the said confinement.

2. The method of shaping unvulcanized rubber having an elastic memory that normally causes said rubber to shrink and swell and change its dimensions in a variable manner after extrusion from a die orifice having a definite desired shape, comprising the steps of extruding the said unvulcanized rubber into a confining cavity having the dimensions and shape of the desired article, said cavity being defined between a stationary confining surface and a movable confining surface, moving said plastic in said cavity along with said moving surface at a rate controlled by the movement of said moving surface while the rubber is confined in the desired dimensions and shape, applying lubricant between the surface of the rubber and said stationary confining surface to prevent said movement of the rubber from introducing disrupting strains into the rubber by reason of engagement of the moving rubber with the stationary confining surface, continuing said movement of the lubricated rubber in confinement between said stationary surface and said moving surface for a period of from 4 to 10 seconds, and thereafter releasing the rubber from confinement, whereby the rubber thereafter substantially retains the dimensions and shape imparted during the said confinement.

References Cited in the file of this patent

UNITED STATES PATENTS

| Number | Name | Date |
| --- | --- | --- |
| 888,412 | Thomson | May 19, 1908 |
| 1,691,899 | Paley | Nov. 13, 1928 |
| 1,802,978 | MacDonald | Apr. 28, 1931 |
| 1,811,430 | Gammeter | June 23, 1931 |
| 1,891,088 | Gammeter | Dec. 13, 1932 |
| 1,939,894 | Goodwin | Dec. 19, 1933 |
| 2,075,735 | Loomis | Mar. 30, 1937 |
| 2,307,055 | Menger et al. | Jan. 5, 1943 |
| 2,399,615 | Bailey et al. | May 7, 1946 |
| 2,443,053 | Parmelee | June 8, 1948 |
| 2,489,951 | Bump | Nov. 29, 1949 |
| 2,567,147 | Cousino | Sept. 4, 1951 |
| 2,581,769 | Olson | Jan. 8, 1952 |

FOREIGN PATENTS

| Number | Country | Date |
| --- | --- | --- |
| 964,125 | France | Jan. 18, 1950 |